US008415027B2

(12) United States Patent
Hayashi et al.

(10) Patent No.: US 8,415,027 B2
(45) Date of Patent: Apr. 9, 2013

(54) LASER WELDING STRUCTURE

(75) Inventors: Hiromasa Hayashi, Obu (JP); Masayuki Takenaka, Nukata-gun (JP); Hiroshi Kasugai, Toyoake (JP); Masaji Imada, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 1056 days.

(21) Appl. No.: 12/382,633

(22) Filed: Mar. 19, 2009

(65) Prior Publication Data

US 2009/0236321 A1 Sep. 24, 2009

(30) Foreign Application Priority Data

Mar. 20, 2008 (JP) .................................. 2008-72630
May 8, 2008 (JP) ................................ 2008-122191
Jan. 22, 2009 (JP) .................................. 2009-11904

(51) Int. Cl.
*B32B 15/01* (2006.01)
*B32B 15/04* (2006.01)
*B32B 15/20* (2006.01)

(52) U.S. Cl. ........ 428/675; 428/680; 428/596; 428/599; 428/213; 428/220

(58) Field of Classification Search .................. 428/675, 428/674, 680, 596, 599, 615, 213, 220
See application file for complete search history.

(56) References Cited

U.S. PATENT DOCUMENTS

| | | | | |
|---|---|---|---|---|
| 6,221,505 | B1 | 4/2001 | Shirai et al. | |
| 2004/0048524 | A1 * | 3/2004 | Yuasa et al. | 439/891 |

FOREIGN PATENT DOCUMENTS

| | | | |
|---|---|---|---|
| JP | A-64-75699 | | 3/1989 |
| JP | A-7-214369 | | 8/1995 |
| JP | A-8-218137 | | 8/1996 |
| JP | 10-334962 | A | 12/1998 |
| JP | A-11-5182 | | 1/1999 |
| JP | 11-138281 | * | 5/1999 |
| JP | A-11-191607 | | 7/1999 |
| JP | 2001-87877 | A | 4/2001 |
| JP | A-2002-117913 | | 4/2002 |
| JP | A-2006-302543 | | 11/2006 |
| JP | A-2007-54854 | | 3/2007 |
| JP | A-2007-144436 | | 6/2007 |

OTHER PUBLICATIONS

Machine Translation, Suzuki JP 2001-087877, Apr. 2001.*
Machine Translation, Fujii et al., JP 10-334962, Dec. 1998.*
Machine Translation, Onizuka et al., JP 11-138281, May 1999.*
Machine Translation, Fujii, JP 11-005182, Jan. 1999.*
Notice of Reasons for Refusal mailed on Mar. 16, 2010 issued from the Japanese Patent Office in the corresponding Japanese patent application No. 2008-072630 (with English translation).

* cited by examiner

*Primary Examiner* — Michael La Villa
(74) *Attorney, Agent, or Firm* — Posz Law Group, PLC

(57) ABSTRACT

A laser welding structure includes a lead, a conductive member, and a welding part. The lead has a nickel plating layer and is made of copper or copper alloy. The conductive member is joined with the lead and is made of copper or copper alloy. The welding part is formed by a laser welding so as to join the lead and the conductive member. An end portion of the welding part has a rounded convex shape.

5 Claims, 10 Drawing Sheets

LASER WELDING STRUCTURE

CROSS REFERENCE TO RELATED APPLICATIONS

The present application is based on and claims priority to Japanese Patent Applications No. 2008-72630 filed on Mar. 20, 2008, No. 2008-122191 filed on May 8, 2008, and No. 2009-11904 filed on Jan. 22, 2009, the contents of which are incorporated in their entirety herein by reference.

BACKGROUND OF THE INVENTION

1. Field of the Invention

The present invention relates to a laser welding structure and a laser welding method.

2. Description of the Related Art

A laser welding using a laser light has an advantage that a welding process can be completed for several milliseconds. Copper and copper alloy have high reflectance with respect to the laser light. Thus, copper and copper alloy are difficult to absorb energy of the laser light. In addition, copper and copper alloy have high thermal conductivity. Thus, a portion melted by an irradiation of the laser light is prone to recrystallize and a crack may generate at the recrystallization.

U.S. Pat. No. 6,221,505 (corresponding to JP-A-11-104865) discloses a laser welding method in which a first member and a second member are overlapped each other and end portions of the first member and the second member are melted. The laser welding method is premised on welding an object having a cylindrical shape. Thus, it is difficult to apply the above-described laser welding method to a welding of conductive members and leads of a semiconductor device arranged at small intervals. In addition, the above-described laser welding method is not considered for using copper or copper alloy having a high laser reflectance.

JP-A-2007-54854 discloses a welding method of copper and copper alloy using electron beam instead of a laser light. When a welding object is irradiated with electron beam, there is a possibility that electric current flows in the welding object. Thus, in a case where leads of a semiconductor device are welded with conductive members using the electron beam, an element of the semiconductor device may be damaged. In addition, when a welding is performed using the electron beam, a welded portion is required to be disposed in a vacuum state. Thus, a welding equipment may be large and complicated.

JP-A-11-5182 discloses a laser welding method in which a welding object made of copper is covered with a plating layer and end of the welding object is cut on a slant. In such a method, the end of the welding object is required to be cut on a slant in a thickness direction of the welding object. Thus, a productivity may be reduced.

JP-A-2007-144436 discloses a laser welding method in which a welding object is formed into a thin plate shape or a welding object is bent, so that the welding object has a high elasticity. In such a case, a productivity may be reduced because an end of the welding object is required to be formed into the thin plate shape or the welding object is required to be bent.

In a laser welding method disclosed in JP-A-7-214369, a first plated metal member is disposed on a second plated metal member. A laser light is irradiated from a surface-side of the first member opposite to the second member so as to form a welding part extending from the surface of the first member to an inside of the second member over a boundary between the first member and the second member. Thereby, the first member is joined with the second member.

In such a case, a plating formed on the first member is made of a material having a high laser absorption rate compared with a material of the plating formed on the second member. Thereby, a laser energy efficiency can be improved and an explosion of a melted portion irradiated with the laser light can be reduced.

However, there is a possibility that the plating formed on the first member has a melting point lower than a melting point of the plating formed on the second member. In a case where the first member is thick as a lead of an integrated circuit package, even if the plating having a high laser absorption rate is formed on the first member, a high energy is required for melting the plating. Thus, an explosion may occur.

SUMMARY OF THE INVENTION

In view of the foregoing problems, it is an object of the present invention to provide a laser welding structure. Another object of the present invention is to provide a laser welding method.

A laser welding structure according to a first aspect of the present invention includes a lead, a conductive member, and a welding part. The lead has a nickel plating layer and is made of copper or copper alloy. The conductive member is joined with the lead and is made of copper or copper alloy. The welding part is formed by a laser welding so as to join the lead and the conductive member. An end portion of the welding part has a rounded convex shape. In the present laser welding structure, a generation of a crack at a recrystallization of the welding part can be restricted.

In a laser welding method according to a second aspect of the present invention, a lead and a conductive member are prepared. The lead has a nickel plating layer and is made of copper or copper alloy. The conductive member is made of copper or copper alloy. The lead and the conductive member are overlapped each other. A laser light is irradiated to an irradiated area of a surface of the lead so as to form a welding part. The irradiated area is located on an opposite side of the lead from the conductive member and includes an end portion of the lead overlapped with the conductive member. The welding part protrudes from the lead and has an end portion formed into a rounded convex shape. In a present laser welding method, a generation of a crack at a recrystallization of the welding part can be restricted.

In a laser welding method according to a third aspect of the present invention, a first member made of metal and a second member made of metal are prepared. On a surface of the first member, a first plating layer having a first laser absorption rate and a first melting point is formed. On a surface of the second member, a second plating layer having a second laser absorption rate and a second melting point is formed. The first laser absorption rate is greater than the second laser absorption rate and the first melting point is higher than or equal to the second melting point. The first member and the second member are overlapped each other. A laser light is irradiated from a surface-side of the first member opposite to the second member so as to join the first member and the second member by forming a welding part extending from the surface of the first member to an inside of the second member over a boundary between the first member and the second member. In the present laser welding method, an explosion of the first plating layer due to heat of the laser light can be restricted.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1A:
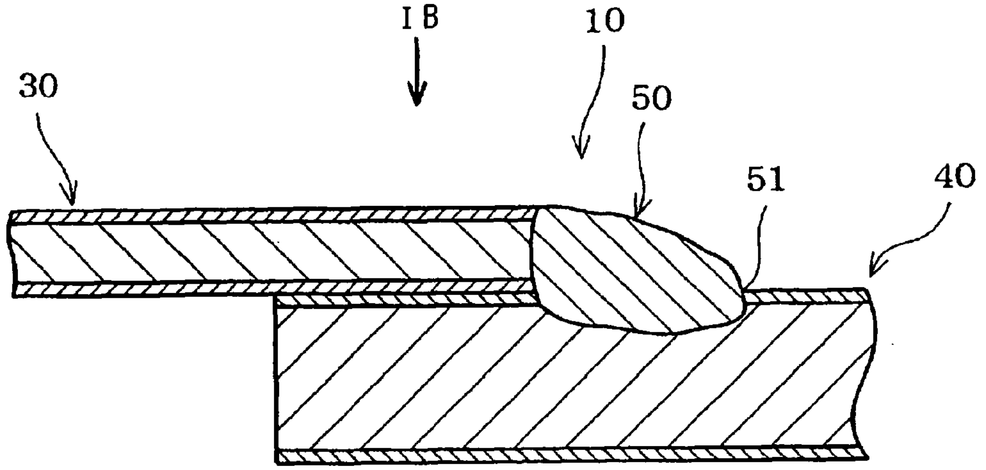
FIG. 1A is a diagram illustrating a cross-sectional view of a laser welding portion to which a laser welding structure according to a first embodiment of the present invention is applied.
Figure 1B:
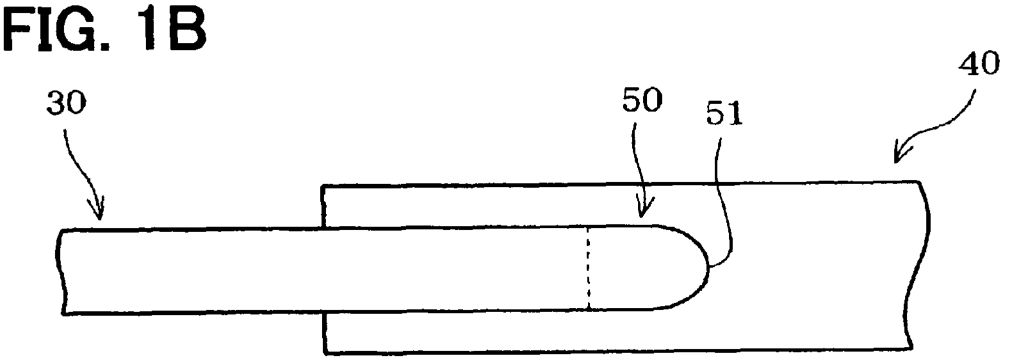
FIG. 1B is a diagram illustrating the laser welding portion viewed from a direction shown by an arrow IB in FIG. 1A.
Figure 2:
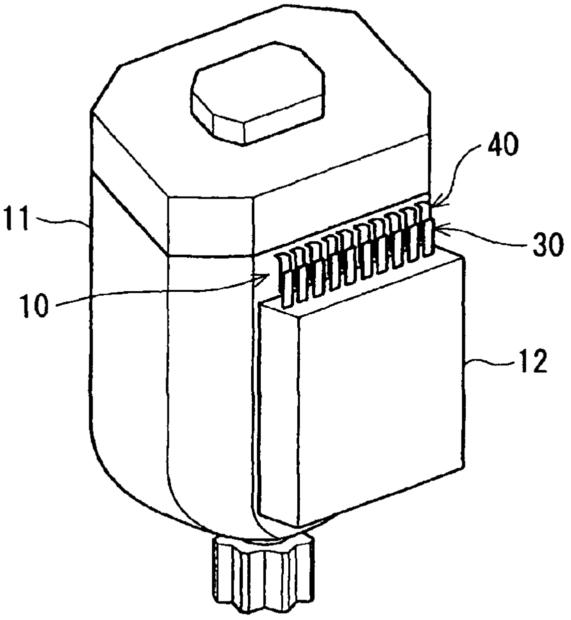
FIG. 2 is a diagram illustrating a motor to which the laser welding structure according to the first embodiment is applied.
Figure 3:
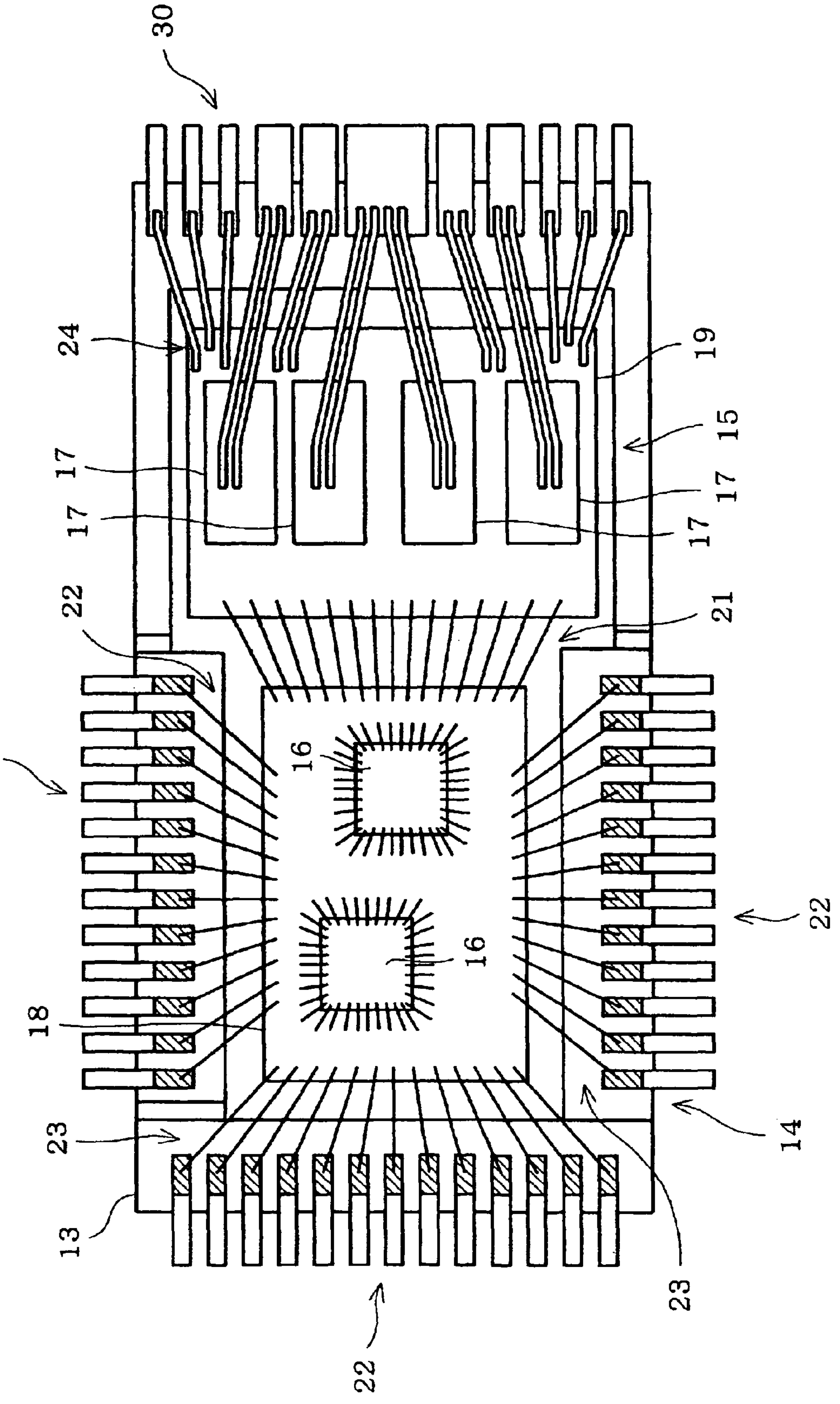
FIG. 3 is a diagram illustrating a mold integrated circuit to which the laser welding structure according to the first embodiment is applied.

A laser welding portion 10 to which a laser molding structure according to a first embodiment of the present invention is illustrated in FIG. 1A and FIG. 1B. The laser welding portion 10 can be applied to, for example, a mold integrated circuit device 12 that is integrated with a motor 11 as illustrated in FIG. 2. The mold integrated circuit device 12 includes a processing section 14 and a control section 15 sealed by a resin package 13, as illustrated in FIG. 3. In the processing section 14, integrated circuit chips 16 each having a plurality of pins are disposed. The integrated circuit chips 16 include, for example, a central processing unit (CPU) and a memory for configurating a microcomputer. In the control section 15, power elements 17 such as a power metal-oxide semiconductor field-effect transistor (power MOSFET) are disposed. The integrated circuit chips 16 in the processing section 14 are mounted on a substrate 18. The power elements 17 in the control section 15 are mounted on a substrate 19. The substrate 18 is electrically coupled with the substrate 19 through bonding wires 21. The bonding wires 21 are made of, for example, gold. The mold integrated circuit device 12 further includes a plurality of leads 22 and a plurality of leads 30 protruding outward from the resin package 13. The leads 22 are electrically coupled with the substrate 18 of the processing section 14 through thin bonding wires 23 made of, for example, gold. The leads 30 are electrically coupled with the power elements 17 in the control section 15 through thick wires 24 made of, for example, aluminum. The leads 30 are connected with conductive members 40 provided at the motor 11, as illustrated in FIG. 2.

As illustrated in FIG. 1A and FIG. 1B, the laser welding portion 10 is formed at a connecting portion of the lead 30 of the mold integrated circuit device 12 and the conductive member 40 of the motor 11. That is, the leaser molding portion 10 include the lead 30 and the conductive member 40. The lead 30 and the conductive member 40 are connected at a welding part 50. The welding part 50 protrudes from an end portion of the lead 30 toward the conductive member 40. An end 51 of the welding part 50 on an opposite side of the mold integrated circuit device 12, that is, an end 51 of the welding part 50 adjacent to the conductive member 40 has a rounded convex shape. In an example illustrated in FIG. 1B, the end 51 of the welding part 50 has a circular arc shape. However, the rounded convex shape is not limited to the circular arc shape. A lower part of the welding part 50 on a side of the conductive member 40 enters into the conductive member 40. The welding part 50 electrically couples the lead 30 and the conductive member 40.

Figure 4A:
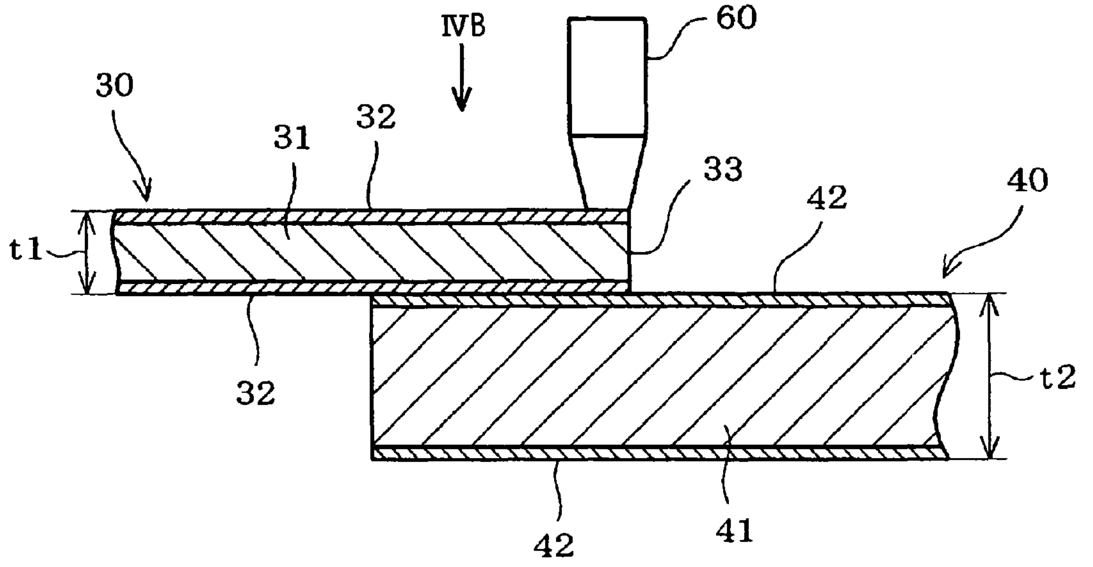
FIG. 4A is a diagram illustrating a cross-sectional view of a lead and a conductive member of the laser welding structure according to the first embodiment.

As illustrated in FIG. 4A, the lead 30 includes a lead body 31 and a plating layer 32. The lead body 31 is formed into a thin plate shape. The lead body 31 is made of copper or copper alloy. The plating layer 32 is made of a nickel-including material such as electroless nickel-phosphorus and electric nickel. The plating layer 32 is formed on two surfaces of the lead body 31 in a thickness direction and two surfaces of the lead body 31 in a width direction. That is, the plating layer 32 is formed on each surfaces of the lead body 31 except for an end surface 33. The conductive member 40 includes a conductive body 41 and a plating layer 42. The conductive body 41 is formed into a thin plate shape. The conductive body 41 is made of copper or copper alloy. The plating layer 42 is made of, for example, tin. The plating layer 42 is formed on two surfaces of the conductive body 41 in a thickness direction and two surfaces of the conductive body 41 in a width direction.

Figure 4B:
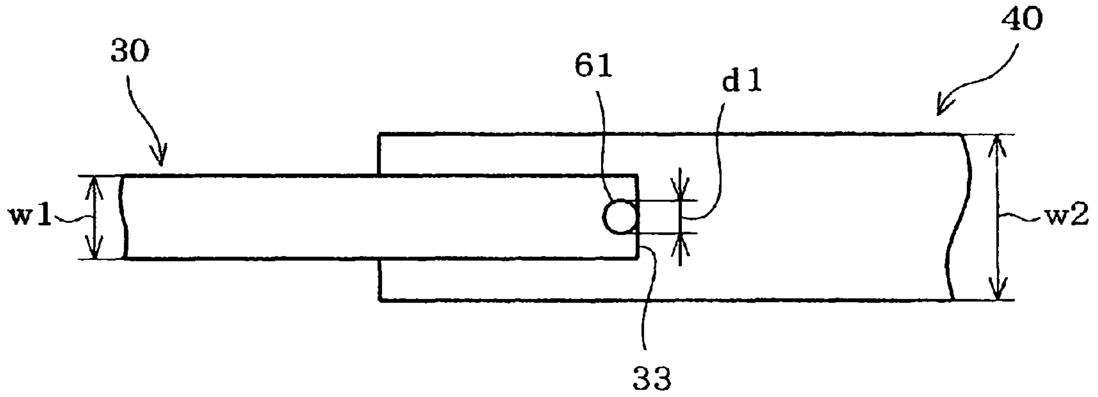
FIG. 4B is a diagram illustrating the lead and the conductive member viewed from a direction shown by an arrow IVB in FIG. 4A.

When the lead 30 and the conductive member 40 are welded by the laser welding portion 10, the lead 30 having the plating layer 32 and the conductive member 40 having the plating layer 42 are overlapped each other, as illustrated in FIG. 4. A laser irradiating equipment 60 irradiates a laser light, for example, yttrium aluminum garnet laser (YAG laser) to the lead 30. As illustrated in FIG. 4B, the laser light from the laser irradiating equipment 60 is irradiated to an irradiated area 61 located on an opposite side of the lead 30 from the conductive member 40. The irradiated area 61 has an approximately circular shape and includes the end surface 33 of the lead 30. By irradiating laser light to the lead 30, the lead 30 and the conductive member 40 are melted and the welding part 50 is formed. The end 51 of the welding part 50 is formed into the circular arc shape, as illustrated in FIG. 1B.

When the laser light is irradiated from the laser irradiating equipment 60 to the lead 30, the plating layer 32 melts before the lead body 31 because the plating layer 32 made of nickel plating has a low laser reflectance and a low melting point with respect to the lead body 31 made of copper or copper alloy. Due to the plating layer 32 melting before the lead body 31, a portion that becomes a seed of the melting generates in the lead 30. The melted plating layer 32 accelerates the melting of the lead body 31. A part melted by the laser light melts the plating layer 42 of the conductive member 40 and the conductive body 41 and enters into the conductive body 41. Thereby, the welding part 50 the lead 30 and the conductive member 40 is formed.

Relationships between a dimension of the lead 30, a dimension of the conductive member 40, and an irradiating condition of the laser light will now be described. In a case where a thickness of the lead 30 including the plating layer 32 is defined as thickness t1 and a thickness of the conductive member 40 including the plating layer 42 is defined as thickness t2, there are advantages when the thicknesses t1 and t2 satisfy a relationship of $t2 \geqq 2 \times t1$. If the thickness t2 is not enough and an output of the laser light irradiated to the lead 30 is high, a lower surface of the conductive member 40 opposite to the lead 30 may melt. If the thickness t2 of the conductive member 40 is greater than twice the thickness t1 of the lead 30, the lower surface of the conductive member 40 can be restricted from melting regardless of the output of the laser light.

In a case where a width of the lead 30 including the plating layer 32 is defined as width w1 and a width of the conductive member 40 including the plating layer 42 is defined as width w2, there are advantages when the widths w1 and w2 satisfy a relationship of $w2 > w1$. If the width w2 is not enough, a positioning of the lead 30 and the conductive member 40 becomes difficult and the end 51 of the welding part 50 is difficult to be the circular arc shape. If the width w2 of the conductive member 40 is greater than the width w1 of the lead 30, the positioning of the lead 30 and the conductive member 40 becomes easy and the end 51 of the welding part 50 can be the circular arc shape.

The irradiated area 61 has a circular shape including the end surface 33 of the lead 30. There are advantages when a diameter d1 of the irradiated area 61 is greater than or equal to a half of the width w1 of the lead 30 and is less than the width w1, that is, $w1 > d1 \geqq w1/2$. When the diameter d1 is set so that the laser irradiated area 61 includes the end surface 33 of the lead 30, the end 51 of the welding part 50 can be the circular arc shape. If the laser light is irradiated at a portion displaced from the end surface 33 of the lead 30 toward the mold integrated circuit device 12 or if the diameter d1 is much less than the width w1 of the lead 30, the end 51 of the welding part 50 is difficult to be the circular arc shape.

The laser light is irradiated so as to satisfy the above-described condition. In the laser welding portion 10 illustrated in FIG. 1A and FIG. 1B, the dimensions of each component are set as follows. The thickness t1 of the lead 30 is about 0.25 mm and the width w1 of the lead 30 is about 0.6 mm. The thickness t2 of the conductive member 40 is about 0.55 mm and the width w2 of the lead 30 is about 0.8 mm. A center of the irradiated area 61 is located at a distance of about 0.15 mm from the end surface 33 of the lead 30 and the irradiated area 61 has the diameter d1 of about 0.3 mm. A thickness of the plating layer 32 of the lead 30 is between about 3 μm and about 7 μm. A thickness of the plating layer 32 of the lead 30 is between about 0.8 μm and about 1.5 μm. The thicknesses of the plating layer 32 and the plating layer 42 can be changed without being limited to the above-described example. In addition, the thickness and the width of each of the lead 30 and the conductive member 40 and the irradiating position can be changed as long as the above-described relationships are satisfied.

Figure 5:
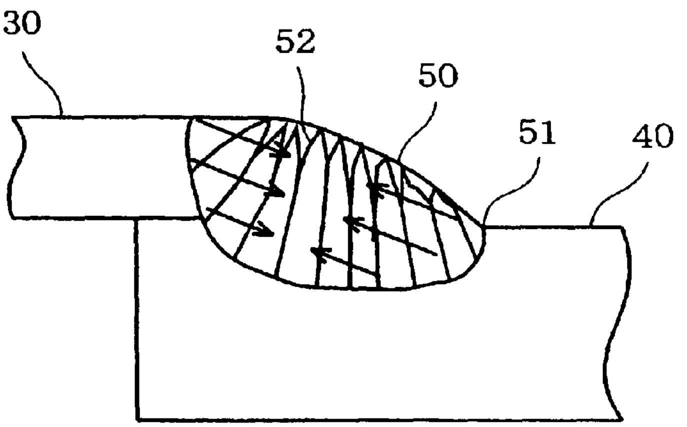
FIG. 5 is a diagram illustrating a crystal at a welding part to which the laser welding structure according to the first embodiment is applied.
Figure 6:
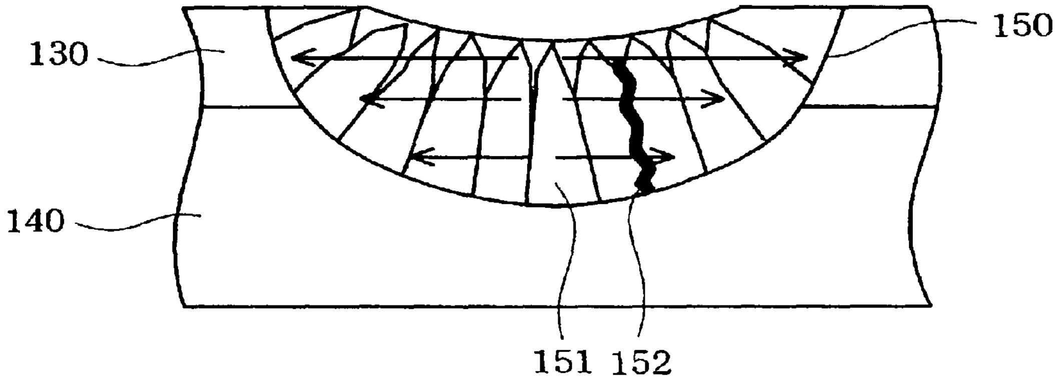
FIG. 6 is a diagram illustrating a crystal at a welding part to which a laser welding structure according to a comparative example is applied.

By irradiating the laser light so as to satisfy the above-described relationships, the end 51 of the welding part 50 can have the rounded convex such as, for example, the circular arc shape. When the welding part 50 protrudes from the lead 30 and the end 51 becomes the rounded convex shape, a crystal 52 in the welding part 50 grows inwardly so as to constrict, as illustrated in FIG. 5. The welding part 50 configured by the mixture of the plating layer 32, the lead body 31, the plating layer 42, and the conductive body 41 melted by the laser light is recrystallized and solidified when the irradiation of the laser light is stopped. The crystal 52 that generates at the recrystallization grows inwardly when the end 51 of the welding part 50 has the rounded convex shape. Thus, when the welding part 50 is recrystallized, the welding part 50 applied with a stress constricting inwardly. As a result, a generation of crack at the recrystallization of the welding part 50 can be reduced.

In contrast, when a lead 130 and a conductive member 140 are overlapped each other and a laser light is irradiated to a portion apart from an end of the lead 130, a crystal 151 that generates at a recrystallization of a welding part 150 grows toward an irradiated surface by stopping the irradiation of the laser light. Thus, the welding part 150 is applied with a stress constricting outwardly and cracks may generate at the recrystallization of the welding part 150.

As described above, the lead 30 includes the plating layer 32 made of nickel plating. By forming the plating layer 32 to the lead 30, even if the lead body 31 is made of copper or copper alloy, the laser reflectance of the lead 30 can be reduced and a laser absorption rate of the lead 30 can be increased. In addition, the plating layer 32 made of nickel plating has a melting point lower than a melting point of the lead body 31. Thus, the portion that becomes the seed of the melding can be easily formed. As a result, the lead 30 and the conductive member 40 can be welded using the laser light without using a large and complicated equipment such as an electron beam. By the laser welding, the lead 30 and the conductive member 40 can be welded at a small area. Thus, even when the leads 30 of mold integrated circuit device 12 are arranged at small intervals, the leads 30 and the conductive members 40 of the motor 11 can be melted with certainty.

In the first embodiment, the end 51 of the welding part 50 is formed to have the rounded convex shape such as, for example, the circular arc shape. Thereby, when the welding part 50 melted by the laser light is recrystallized, the crystal 52 of the welding part 50 grows inwardly and the welding part 50 is applied with the stress in the constricting direction. Thus, the generation of crack at the recrystallization of the welding part 50 can be reduced. In addition, because the welding part 50 is formed at the end of the lead 30 and the end 51 of the welding part 50 is formed to have the rounded convex shape, it is not required to cut the end of the lead 30 on a slant. Thus, the lead 30 made of copper or copper alloy and the conductive member 40 can be welded using the laser light without reducing a productivity.

In the first embodiment, the lead 30 includes the plating layer 32 made of nickel plating. The lead 30 is coupled with the power element 17 through the thick wire 24 at an end portion opposite to the conductive member 40. The plating layer 32 made of nickel plating has high affinity with the thick wire 24 made of aluminum. Thus, by forming the plating layer 32, the lead 30 can be connected with the conductive member 40 by the welding part 50 and a connectivity of the lead 30 with the thick wire 24 can be improved.

Second Embodiment

Figure 7:
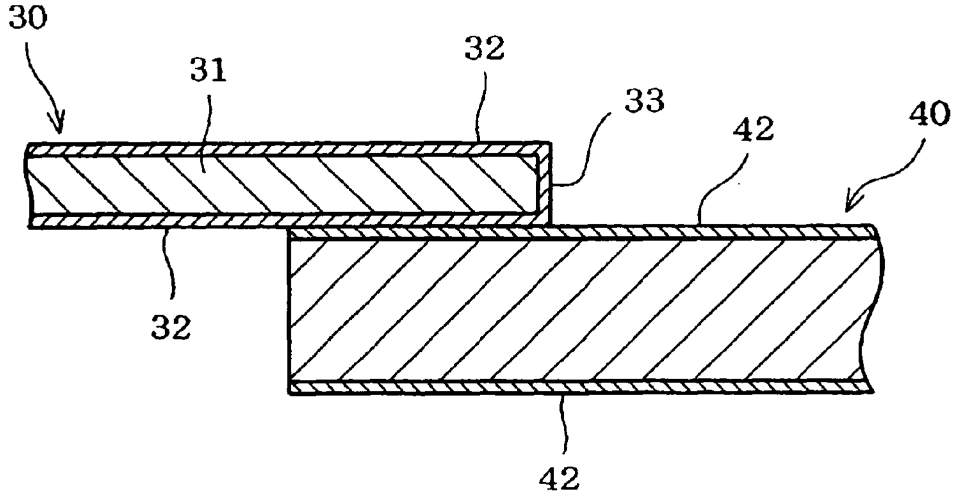
FIG. 7 is a diagram illustrating a cross-sectional view of a lead and a conductive member of a laser welding structure according to a second embodiment of the present invention.

A laser welding structure according to a second embodiment will be described with reference to FIG. 7. In the present embodiment, the plating layer 32 is formed on the end surface 33 of the lead 30 in addition to the two surfaces of the lead body 31 in the thickness direction and the two surfaces of the lead body 31 in the width direction. By providing the plating layer 32 on the end surface 33 of the lead 30, the area of the plating layer 32 having a low melting point increases. Thereby, when the laser light is irradiated, the portion that becomes the seed of melting can be easily formed at the plating layer 32. Thus, the welding part 50 can be formed effectively. When the plating layer 32 is provided on the end surface 33 of the lead 30, the plating layer 32 may be formed after the lead 30 is punched out from a frame (not shown). Before punching out, the plating layer 32 may be formed on each of the surfaces of the lead body 31 except for the end surface 33.

Third Embodiment

Figure 8:
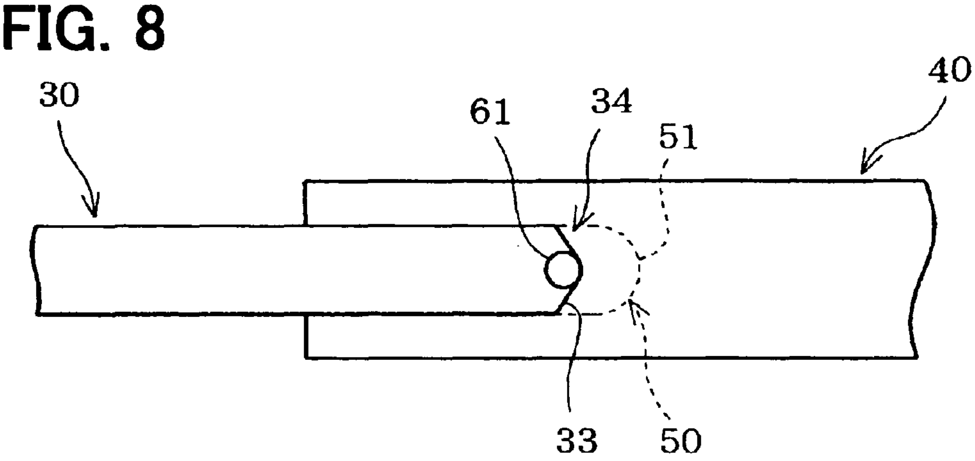
FIG. 8 is a diagram illustrating a lead and a conductive member of a laser welding structure according to a third embodiment of the present invention.

A laser welding structure according to a third embodiment of the present invention will be described with reference to FIG. 8. In the present embodiment, the lead 30 has a chamfered part 34. The chamfered part 34 is formed by cutting edges of the end surface 33 of the lead 30. That is, at the end portion of the lead 30, a periphery of the irradiated area 61 is cut on a plane. In FIG. 8, the welding part 50 formed by irradiating the laser light is illustrated by a dashed line. By providing the chamfered part 34, the end 51 of the welding part 50 melted at the irradiation of the laser light becomes a shape similar to the end surface 33 of the lead 30. Thus, the end 51 of the welding part 50 can be the circular arc shape more easily. As a result, a generation of a crack at the welding part 50 can be reduced. The chamfered part 34 can be formed when the lead 30 is punched out from the frame.

Fourth Embodiment

Figure 9:
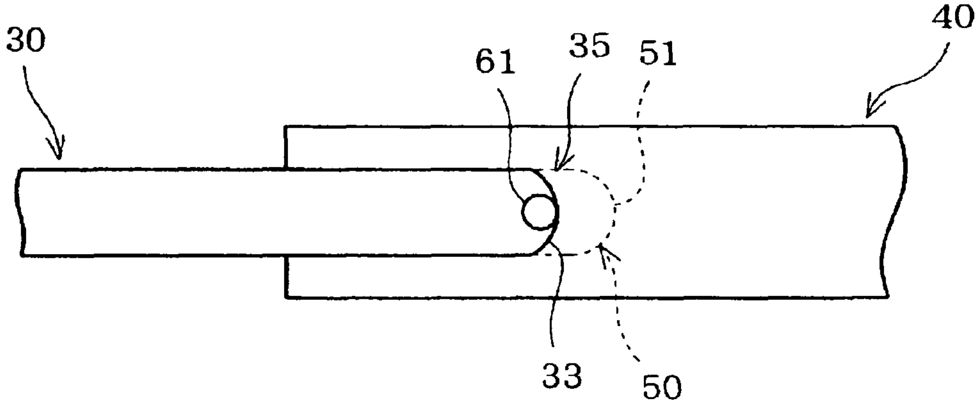
FIG. 9 is a diagram illustrating a lead and a conductive member of a laser welding structure according to a fourth embodiment of the present invention.

A laser welding structure according to a fourth embodiment will be described with reference to FIG. 9. In the present embodiment, the lead 30 has a chamfered part 35. The chamfered part 35 is provided at the end surface 33 of the lead 30 so as to have a circular arc shape. That is, the end portion of the lead 30 including the irradiated area 61 is formed into the circular arc shape. In FIG. 9, the welding part 50 formed by irradiating the laser light is illustrated by a dashed line. By providing the chamfered part 35 having the circular arc shape at the end portion of the lead 30, the end 51 of the welding part 50 melted at the irradiation of the laser light becomes a shape similar to the end surface 33 of the lead 30. Thus, the end 51 of the welding part 50 can be the circular arc shape more easily. As a result, a generation of a crack at the welding part 50 can be reduced. The chamfered part 35 can be formed when the lead 30 is punched out from the frame.

Figure 10:
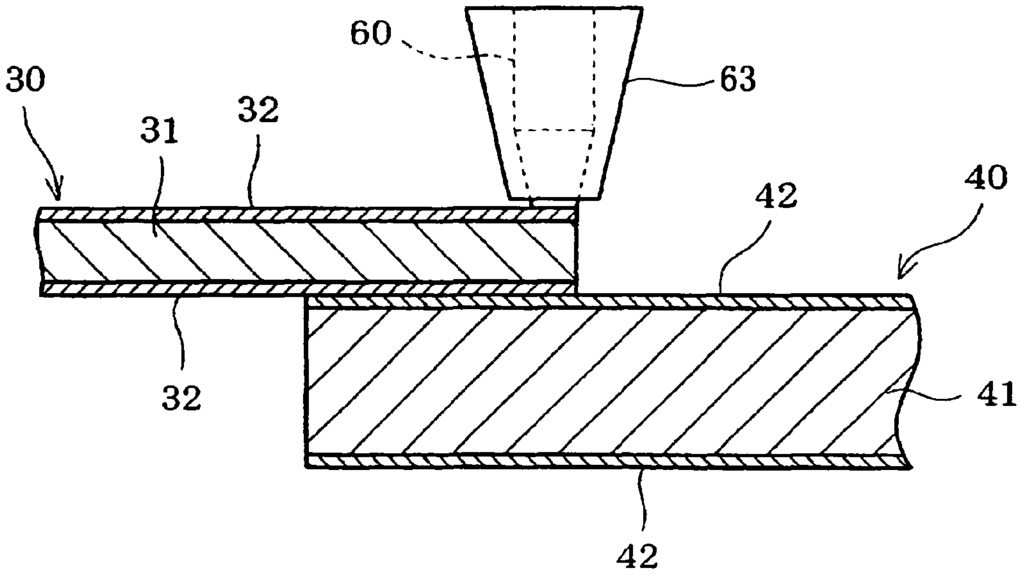
FIG. 10 is a diagram illustrating an exemplary process of a laser welding method.

In the above-described first to fourth embodiments, the laser irradiating equipment 60 may be housed in a gas supply nozzle 63 as illustrated in FIG. 10, and inert gas may be supplied from the gas supply nozzle 63 to the irradiated area when the laser light is irradiated. The inert gas may include nitrogen or argon, for example. When the inert gas is supplied to the irradiated area 61 that becomes the welding part 50, a surface tension of the melted welding part 50 changes. Due to the change in the surface tension, the crystal 52 is prompted to grow inwardly when the welding part 50 is recrystallized. Thus, a generation of a crack at the recrystallization of the welding part 50 can be reduced.

Figure 11A:
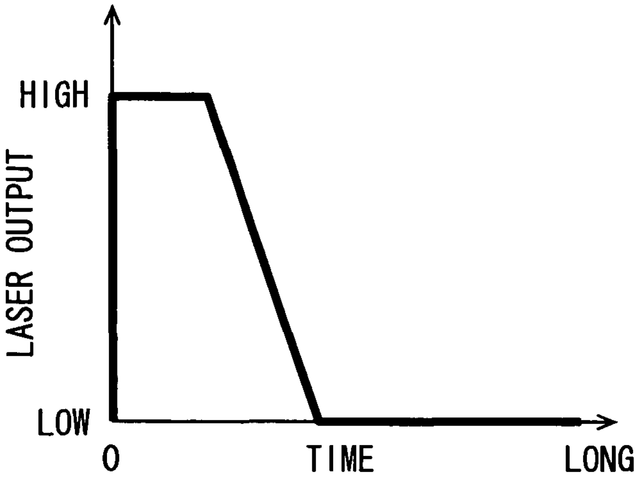
FIG. 11A and FIG. 11B are graphs illustrating a change in a laser output of a laser welding.
Figure 11B:
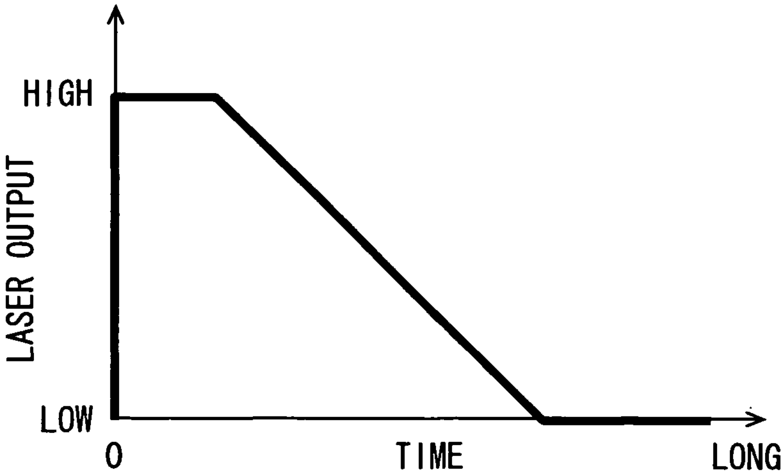

An output of the laser light may be gradually reduced after the welding part 50 is melted. As illustrated in FIG. 11B, when the output of the laser light is gradually reduced compared with a general laser welding method illustrated in FIG. 11A, a temperature of the melted welding part 50 is gradually reduced. Thus, when the welding part 50 is recrystallized, the crystal 52 slowly grows inwardly. Thereby, the welding part 50 is applied with an inward stress and a generation of a crack can be reduced. The laser welding structure according to the above-described first to fourth embodiments can be applied to various laser welding portions without being limited to the laser welding portion 10 of the motor 11 and the mold integrated circuit device 12.

Fifth Embodiment

Figure 12A:
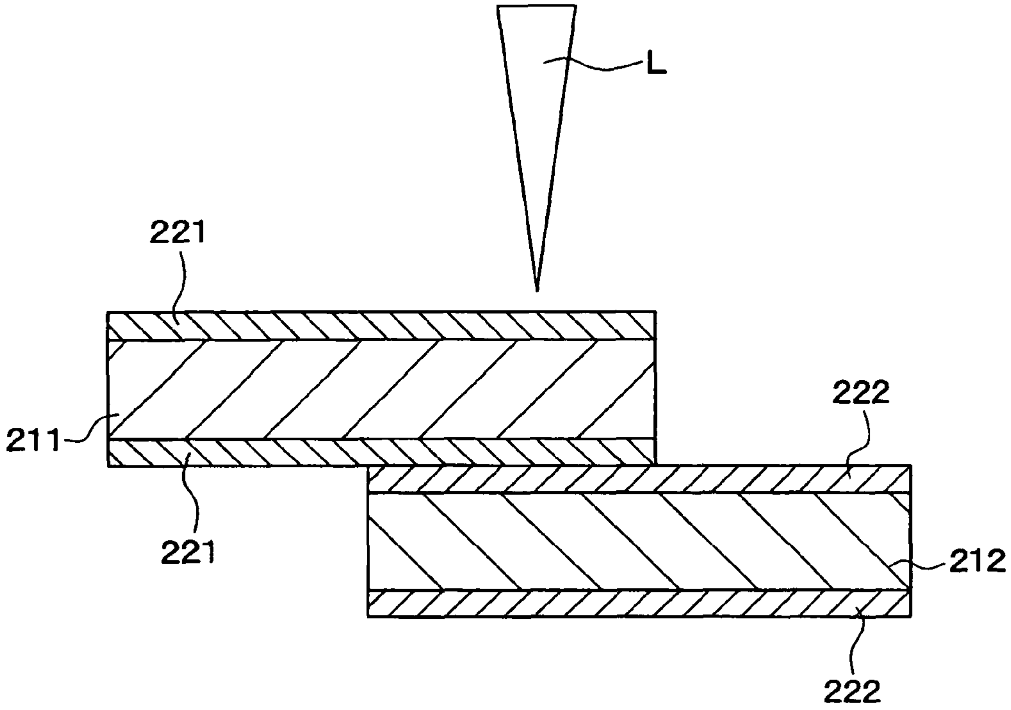
FIG. 12A and FIG. 12B are diagrams illustrating processes of a laser welding method according to a fifth embodiment of the present invention.

A laser welding method according to a fifth embodiment of the present invention will be described with reference to FIG. 12A and FIG. 12B. The present laser welding method can be used for forming a laser welding structure 201 illustrated in FIG. 12B.

In the present laser welding method, a first member 211 made of a metal is overlapped a second member 212 made of a metal. A laser light L is irradiated from a surface-side of the first member 211 opposite to the second member 212. Thereby, a welding part 230 extending from the surface of the first member 211 to an inside of the second member 212 over a boundary between the first member 211 and the second member 212 is formed and the first member 211 is joined with the second member 212.

An overlapped portion of each of the first member 211 and the second member 212 has a plate shape. The present laser welding structure can be applied to, for example, a general terminal, a lead frame, and a bus bar. The first member 211 is made of copper or copper alloy. The second member 212 is made of copper, copper alloy, or iron alloy.

Before the first member 211 and the second member 212 are overlapped each other, a first plating layer 221 is formed on the surface of the first member 211 and a second plating layer 222 is formed on a surface of the second member 212. A laser absorption rate of the first plating layer 221 is greater than a laser absorption rate of the second plating layer 222. A melting point of the first plating layer 221 is higher than or equal to a melting point of the second plating layer 222.

For example, the first plating layer 221 may be an Au/Pd/roughened Ni plating in which a gold (Au) plating, a palladium (Pd) plating, and a roughened nickel (Ni) plating are stacked in order from a side of the first member 211. Alternatively, the first plating layer 221 may be one-layer roughened Ni plating.

The Au/Pd/roughened Ni plating and the one-layer roughened Ni plating can be formed by electroplating or electroless plating. A surface roughness of the Au/Pd/roughened Ni plating and a surface roughness of the one-layer roughened Ni plating can be controlled with a plating condition including chemical and temperature.

In the Au/Pd/roughened Ni plating, the roughened Ni plating has a thickness of a few μm, the Pd plating has a thickness of a few tens of nm, and the Au plating has a thickness of between a few nm and 10 nm, for example. The one-layer roughened Ni plating has a thickness of a few μm, for example.

The second plating layer 222 may be a Ni plating or a tin (Sn) plating. A surface roughness of the second plating layer 222 is less than the surface roughness of the first plating layer 221. The Ni plating and the Sn plating can be formed by electroplating or electroless plating. The second plating layer 222 has a thickness of a few μm.

In the present embodiment, the laser absorption rate of the first plating layer 221 is set to be greater than the laser absorption rate of the second plating layer 222 by providing a difference in the surface roughness of the first plating layer 221 and the second plating layer 222. Alternatively, the first plating layer 221 may have a color that is subject to absorb the laser light so that the laser absorption rate of the first plating layer 221 can be greater than the laser absorption rate of the second plating layer 222.

For example, the surface roughness can be defined as a specific surface area measured by processing an image of the surface taken with an atom force microscope (AFM). When the specific surface area is large, the number and a dimension of irregularities of the surface are large. Accordingly, the surface roughness is large.

As described above, the surface roughness of the first plating layer 221 is set to be greater than the surface roughness of the second plating layer 222 by controlling the plating condition. Thereby, the laser absorption rate of the first plating layer 221 is set to be greater than the laser absorption rate of the second plating layer 222. A member having a high laser absorption rate can be melted by a low laser power.

When both of the first plating layer 221 and the second plating layer 222 are made of Ni, the melting point of the first plating layer 221 can be substantially equal to the melting point of the second plating layer 222. When the first plating layer 221 is made of Ni and the second plating layer 222 is made of Sn, the melting point of the first plating layer 221 can be higher than the melting point of the second plating layer 222.

Even if the first plating layer 221 and the second plating layer 222 are made of the same material, the melting point of the first plating layer 221 can be higher than the melting point of the second plating layer 222 when the first plating layer 221 is formed by electroplating and the second plating layer 222 is formed by electroless plating. For example, when the first plating layer 221 is a roughened Ni plating formed by electroplating and the second plating layer 222 is a Ni plating formed by electroless plating, the melting point of the first plating layer 221 can be higher than the melting point of the second plating layer 222.

In the above-described way, the first plating layer 221 is formed on the first member 211, and the second plating layer 222 is formed on the second member 212. The laser absorption rate of the first plating layer 221 is greater than the laser absorption rate of the second plating layer 222. In addition, the melting point of the first plating layer 221 is higher than or equal to the melting point of the second plating layer 222. Then, as illustrated in FIG. 12A, the first member 211 and the second member 212 are overlapped each other.

The laser light L is irradiated from the surface-side of the first member 211 opposite to the second member 212. The laser light L is YAG laser, for example. From the surface-side of the first member 211, the first plating layer 221, the first member 211, the second plating layer 222, and the second member 212 are melted so as to form the melting part 230.

The welding part 230 is continuously formed from the surface of the first member 211 to the inside of the second member 212 over the boundary between the first member 211 and the second member 212. When the welding part 230 is formed, the first member 211 and the second member 212 are joined with each other.

Because the laser absorption rate of the first plating layer 221 is higher than the laser absorption rate of the second plating layer 222, energy of the laser light L irradiated to the first member 211 can be reduced.

In addition, because the melting point of the first plating layer 221 is higher than or equal to the melting point of the second plating layer 222, a thermal resistance of the first plating layer 221 for the laser light L can be improved. Thus, in the laser welding method according to the present embodiment, the laser welding can be performed with low laser energy and an explosion of the first plating layer 221 due to heat of the laser light L can be restricted.

Figure 12B:
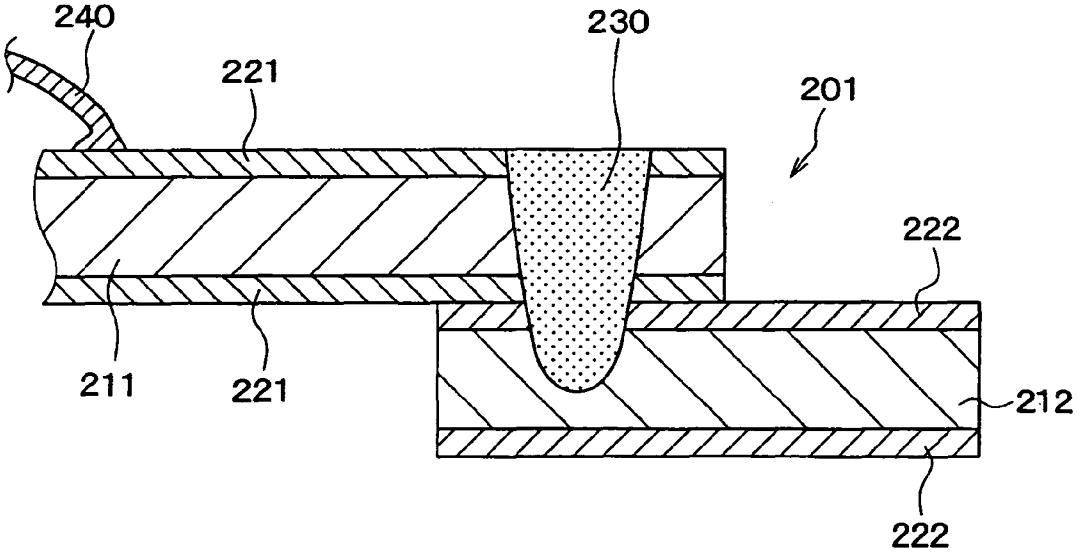

As illustrated in FIG. 12B, in the laser welding structure 201, the first member 211 is coupled with a bonding wire 240 at a portion other than the welding part 230. The bonding wire 240 is made of aluminum (Al) and can be formed by a general wire bonding method.

When the bonding wire 240 is coupled with the first member 211, if the surface roughness of the first plating layer 221 is too large, a bonding performance may be reduced. A preferred surface roughness of the first plating layer 221 in view of the laser absorption rate and the bonding performance can be determined, for example, by an experiment as was performed by the inventors.

The first plating layer 221 made of the Au/Pd/roughened Ni plating is formed on the surface of the first member 211 by electroplating. The Au/Pd/roughened Ni plating having different specific surface area Sa are formed, and the bonding wire 240 is coupled with each of the Au/Pd roughened Ni plating.

A relationship between the specific surface area and a laser welding energy and a relationship between the specific surface area and a tensile strength of the bonding wire 240 of the above-described samples are investigated. The laser welding energy is the energy of the laser light L required for welding. Thus, the laser absorption rate is large when the laser welding energy is low. In addition, a bonding strength of the bonding wire 240 is high when the tensile strength of the bonding wire 240 is high.

Figure 13:
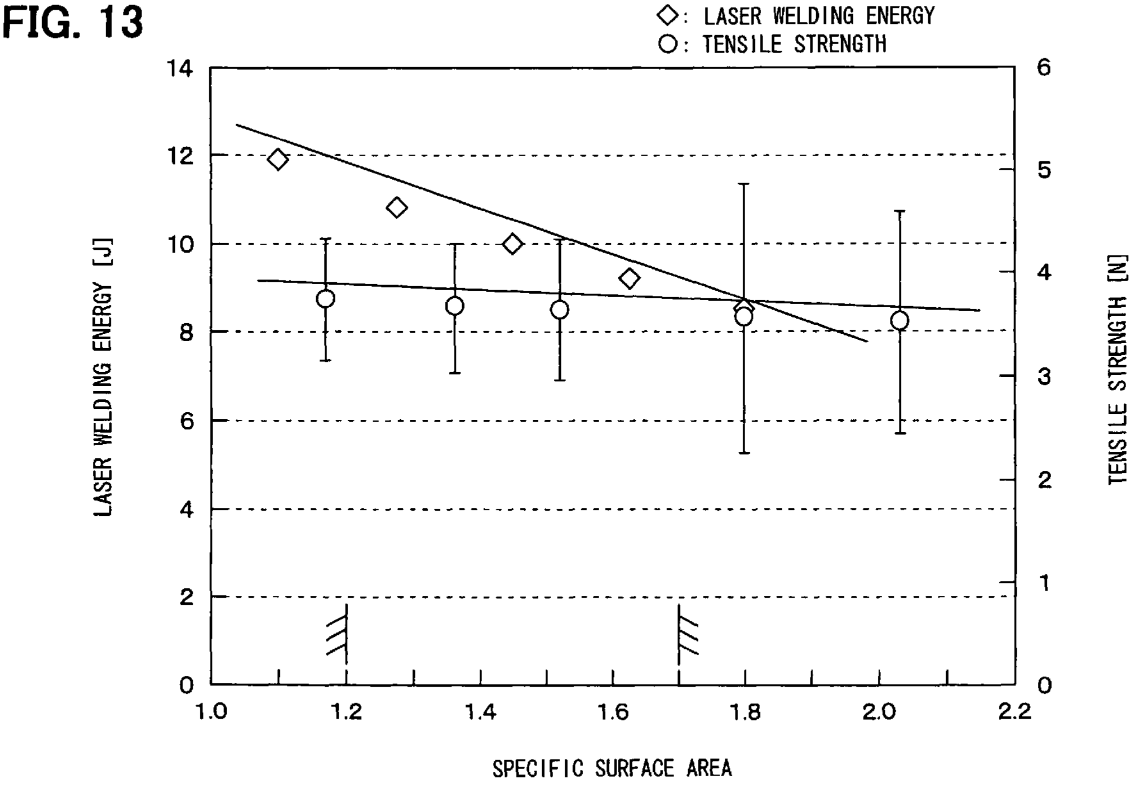
FIG. 13 is a graph illustrating a relationship between a specific surface area of Au/Pd/roughened Ni plating and a laser welding energy and a relationship between the specific surface area and a tensile strength of a bonding wire.

In a graph illustrated in FIG. 13, the specific surface area of 1.0 means a mirror surface on which there is no irregularity.

As illustrated in FIG. 13, when the specific surface area increases, the laser welding energy reduces. That is, when the surface roughness increases, the laser absorption rate increases. This is because the color of the first plating layer 221 approach black when the surface roughness of the first plating layer 221 becomes large and black is a color being prone to absorb the laser light L.

In addition, when the surface roughness increases, the tensile strength of the bonding wire 240, that is, the bonding performance of the bonding wire 240 reduces. Thus, the relationship between the surface roughness and the laser absorption rate is opposite to the relationship between the surface roughness and the bonding performance. According to the experimental result, the preferred specific surface area of the first plating layer 221 is between about 1.2 and about 1.7.

Sixth Embodiment

A laser welding method according to a sixth embodiment of the present invention will be described with reference to FIG. 14. The surface of the first member 211 is irradiated with the laser light L at an irradiated area 211*a* shown by dashed circle in FIG. 14.

Before the first member 211 and the second member 212 are overlapped each other, a third plating layer 223 is formed in the irradiated area 211*a* on the surface of the first member 211. A laser absorption rate of the third plating layer 223 is less than the laser absorption rate of the first plating layer 221. In the irradiated area 211*a*, both of the first plating layer 221 and the third plating layer 223 exist on a plane. In FIG. 14, FIG. 16A, FIG. 16B, and FIG. 16C, a surface of the third plating layer 223 is shown by oblique hatching so that the first plating layer 221 and the third plating layer 223 can be distinguished easily. The first member 211 and the second member 212 are overlapped each other and are welded in a manner similar to the fifth embodiment.

Figure 14:
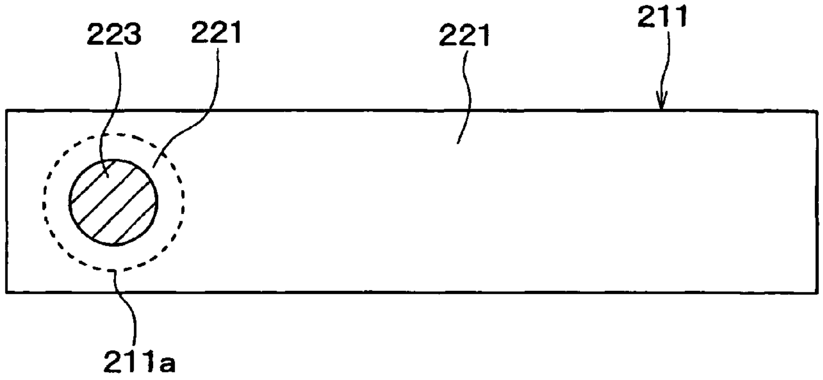
FIG. 14 is a diagram illustrating a laser welding portion to which a laser welding method according to a sixth embodiment of the present invention is applied.

In an example illustrated in FIG. 14, the third plating layer 223 has an approximately circular shape and is formed at an approximately center portion of the irradiated area 211*a*. The first plating layer 221 is formed at an outside of the third plating layer 221. The third plating layer 223 can be formed by electroplating or electroless plating, for example. A surface roughness of the third plating layer 223 is less than the surface roughness of the first plating layer 221. The first plating layer 221 and the third plating layer 223 can be easily formed by dividing the irradiated area 221*a* into a forming area of the first plating layer 221 and a forming area of the third plating layer 223 using masks.

The laser absorption rate of the third plating layer 223 is less than the laser absorption rate of the first plating layer 221. A relationship between a melting point of the third plating layer 223 and the melting points of the first plating layer 221 and the second plating layer 222 is not limited. In addition, a relationship between the laser absorption rate of the third plating layer 223 and the laser absorption rate of the second plating layer 222 is not limited.

Figure 15A:
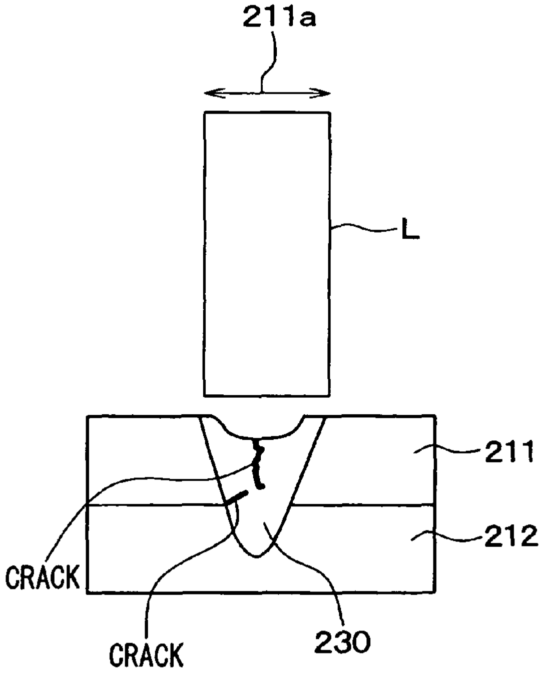
FIG. 15A is a diagram illustrating a cross-sectional view of a laser welding portion in a case where only a first plating layer is formed in an irradiated area.
Figure 15B:
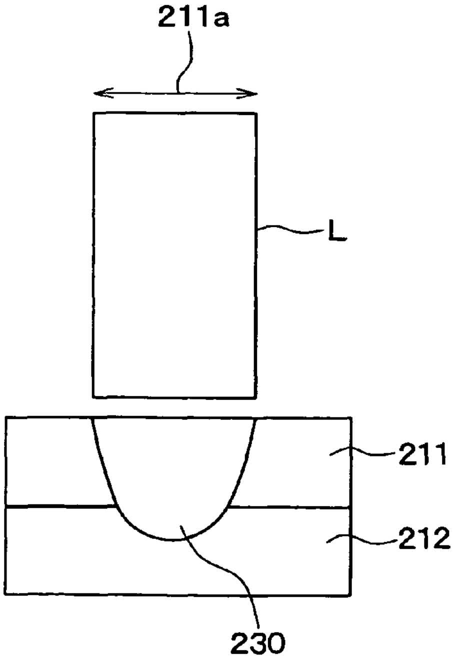
FIG. 15B is a diagram illustrating a cross-sectional view of a laser welding portion in a case where the first plating layer and a third plating layer are formed in the irradiated area.

In a case where only the first plating layer 221 is formed in the irradiated area 221*a*, an aspect ratio of the welding part 230, that is, a ratio of a depth of the welding part 230 to a width of the welding part 230 is large as illustrated in FIG. 15A. In such a case, the welding part 230 has a steep shape and a crack may generate when the welding part 230 is recrystallized.

In a case where the first plating layer 221 and the third plating layer 223 are formed in the irradiated area, a generation of a crack at the recrystallization of the welding part 230 can be restricted. This mechanism is assumed as described below.

When the irradiated area 221*a* including the first plating layer 221 and the third plating layer 223 are irradiated with the laser light L, the first plating layer 221 having the high laser absorption rate melts earlier than the third plating layer 223 having the low laser absorption rate. When there is a difference in the melting rate, the welding part 230 expands outwardly compared with a case where only the first plating layer 221 is formed in the irradiated area 221*a*. Thus, the incline of the welding part 230 becomes gentle and a generation of a crack at the recrystallization of the welding part 230 can be restricted.

Figure 16A:
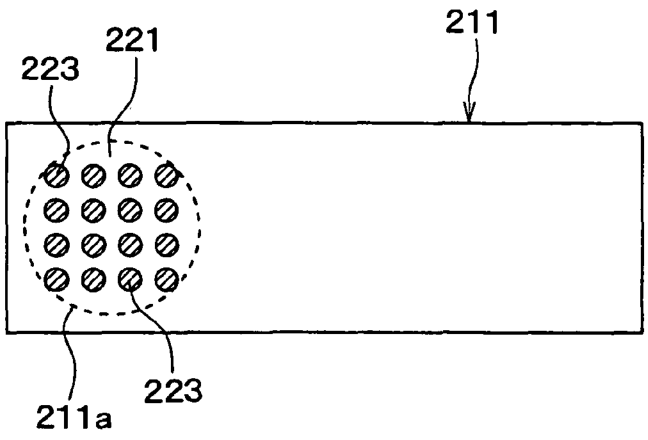
FIG. 16A to FIG. 16C are diagrams illustrating exemplary arrangements of the first plating layer and the third plating layer.
Figure 16B:
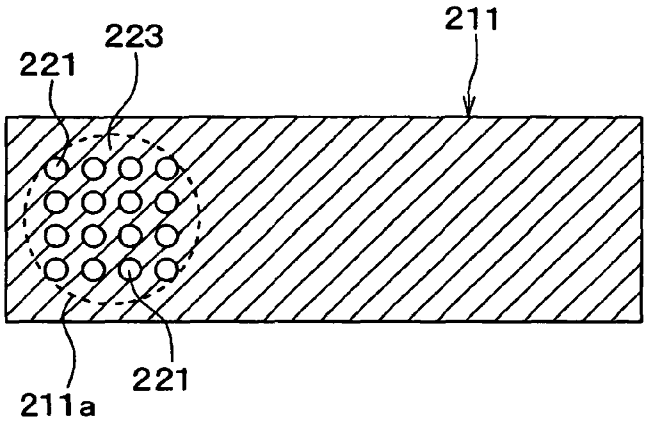
Figure 16C:
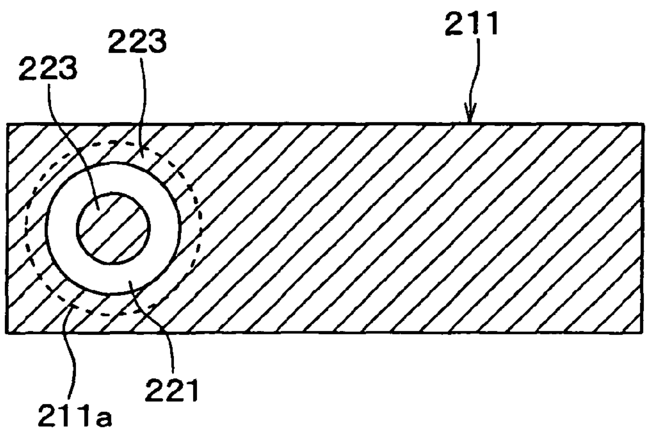

The arrangement of the third plating layer 223 is not limited to the example illustrated in FIG. 14. For example, as illustrated in FIG. 16A, the third plating layer 223 may be formed into a plurality of circles in the irradiated area 211*a*, and the first plating layer 221 may be formed at a clearance between the circles of the third plating layer 223. Alternatively, as illustrated in FIG. 16B, the first plating layer 221 may be formed into a plurality of circles in the irradiated area 211*a*, and the third plating layer 223 may be formed at a clearance between the circles of the first plating layer 221. Alternatively, as illustrated in FIG. 16C, the first plating layer 221 may be formed into a circular shape in the irradiated area 211*a* and the third plating layer 223 may be formed at a center portion of the first plating layer 221 and an outside of the first plating layer 221.

The material and the thickness of each of the first plating layer 221 and the second plating layer 222 are not limited to the above-described example as long as the laser absorption rate of the first plating layer 221 is greater than the laser absorption rate of the second plating layer 222, and the melting point of the first plating layer 221 is higher than or equal to the melting point of the second plating layer 222.

What is claimed is:

1. A laser welding structure comprising:

a lead including a nickel plating layer and being made of copper or copper alloy;

a conductive member joined with the lead and made of copper or a copper alloy; and a welding part formed by a laser welding so as to join the lead and the conductive member, the welding part protruding outward from an end portion of the lead, an end portion of the welding part having a rounded convex shape, wherein the lead has a thickness of t1 and a width of w1;

the conductive member has a thickness of t2 and a width of w2;

t1 and t2 satisfy a relationship of $t2 \geqq 2_x t1$; and w1 and w2 satisfy a relationship of $w2 \geqq w1$.

2. The laser welding structure according to claim 1, wherein an end portion of the lead adjacent to the conductive member has a chamfered part.

3. The laser welding structure according to claim 2, wherein the chamfered part is formed by cutting edges of the end portion of the lead.

4. The laser welding structure according to claim 2, wherein the chamfered part has a rounded convex shape.

5. The laser welding structure according to claim 1, wherein the nickel plating layer covers two surfaces of the lead in a thickness direction, two surfaces of the lead in a width direction, and an end surface of the lead adjacent to the conductive member.

* * * * *